United States Patent [19]

Howell et al.

[11] Patent Number: 4,665,379
[45] Date of Patent: May 12, 1987

[54] VEHICLE SECURITY SYSTEM

[75] Inventors: Jack D. Howell, Los Angeles; Arthur F. Glomski, Venice, both of Calif.

[73] Assignee: Anes Electronics, Inc., Venice, Calif.

[21] Appl. No.: 608,960

[22] Filed: May 10, 1984

[51] Int. Cl.$^4$ .............................................. B60R 25/00
[52] U.S. Cl. ...................................... 340/63; 340/65; 180/287; 307/10 AT
[58] Field of Search ................... 340/63, 64, 65, 566; 180/287; 307/10 AT

[56] References Cited

U.S. PATENT DOCUMENTS

| | | | |
|---|---|---|---|
| 3,967,239 | 6/1976 | Steele | 340/63 |
| 4,038,635 | 7/1977 | Schotz | 340/63 |
| 4,151,507 | 4/1979 | Willis | 340/64 |
| 4,205,300 | 5/1980 | Ho et al. | 340/65 |
| 4,262,279 | 4/1981 | Dublirer | 340/63 |
| 4,333,093 | 6/1982 | Raber et al. | 340/566 |
| 4,358,750 | 11/1982 | Webster | 340/63 X |
| 4,521,768 | 6/1985 | Haran et al. | 340/566 |

Primary Examiner—James L. Rowland
Assistant Examiner—Jeffery A. Hofsass
Attorney, Agent, or Firm—Harris, Kern, Wallen & Tinsley

[57] ABSTRACT

A security system for a vehicle such as an automobile, which provides an audible alarm and radio transmission to a pager when an attempt is made to enter the vehicle. A passive system which automatically sets itself when the ignition is turned off, with an exit time delay permitting the operator to leave the vehicle after turning the ignition off and with an entrance time delay permitting the operator to enter the vehicle and turn the alarm off. A sound detection system which provides an alarm when vehicle intrusion is attempted as by breaking glass or use of a pry bar, while discriminating against ordinary street noises such as operation of other vehicles, sirens and the like. An alarm operated by battery voltage changes such as are produced by opening of a door and energizing a courtesy light, while inhibiting alarm when there are other battery voltage changes such as those produced by operation of a cooling fan.

23 Claims, 5 Drawing Figures

FIG. 2b.

VEHICLE SECURITY SYSTEM

BACKGROUND OF THE INVENTION

This invention relates to security systems for vehicles such as automobiles, vans and trucks, and in particular a new and improved system for providing an indication when unauthorized entry into a vehicle is attempted.

There is a wide variety of vehicle security systems on the market today and perhaps the most common problem with most of these systems is that of false triggering, that is, an alarm is produced even though no entry into the vehicle has been attempted. This may occur as a result of over-sensitive detectors and/or inadequate discrimination against ambient activity. As a result of the high incidence of false triggering, one tends to ignore the alarm and thereby adversely affecting the protection afforded by the system.

Some existing security systems utilize noise detection for sensing unauthorized entry. However, these systems are particularly susceptible to false triggering from external noises, such as passing vehicles, construction work, sirens, rain, thunder and the like.

It is an object of the present invention to provide a new and improved vehicle security system which utilizes noise detection as one form of sensing, with discrimination incorporated in the noise detection system for separating signals resulting from actual intrusion activity and signals resulting from external sounds.

Another form of detection utilized in existing systems is based on changes in vehicle battery voltage resulting from courtesy lights and the like being energized by opening of a closure, such as a door, the hood or the trunk lid. Of course, authorized entry also produces the same activity and hence some form of discrimination or inhibiting is required in a satisfactory system. Another problem arises in newer vehicles which have cooling fan activity after the motor has stopped, since turning on the fan motor produces a change in the battery voltage which is sensed. This activity produces false triggering unless some form of compensation is utilized.

It is another object of the invention to provide a new and improved vehicle security system incorporating battery voltage sensing while limiting triggering to lamp energization, discriminating against fan motor operation, and permitting authorized entrance without triggering of the alarm.

It is an additional object of the invention to provide such a vehicle security system which incorporates additional features including an audible alarm, a radio transmitted alarm, alarm timing, entrance and exit delays, and provisions for instant on operation and panic operation.

Other objects, advantages, features and results will more fully appear in the course of the following description.

SUMMARY OF THE INVENTION

A vehicle security system incorporating a microphone for converting sound to electrical signals, an alarm, and a noise discriminator connected between the microphone and the alarm for producing an output for triggering the alarm in response to particular electrical signals from the microphone such as non-continuous signals with certain time intervals between the signals. By way of example, electrical signals produced by the sound of breaking glass. A security system incorporating means for sensing a change in the output of the vehicle power supply corresponding to that occurring when a lamp is energized by opening a closure, and circuitry for connecting the sensing means to the alarm. An alarm inhibiting arrangement controlled by the vehicle ignition switch for preventing an alarm when the owner makes an authorized entry and turns on the ignition, and a time delay circuit which delays producing an alarm as a result of battery voltage change detection to provide an opportunity for the owner to inhibit the alarm by using the ignition switch, since authorized entry will produce battery voltage change and jingling of keys produces sound spectra similar to that of breaking glass. Another alarm inhibit configuration associated with another battery voltage change sensing circuit which responds to operation of a cooling fan motor and prevents false triggering of the alarm. A security system as described which has provision for audible alarm and radio transmitted alarm, vehicle exit delay, instant on and panic on controls.

DESCRIPTION OF THE PREFERRED EMBODIMENTS

Figure 1:
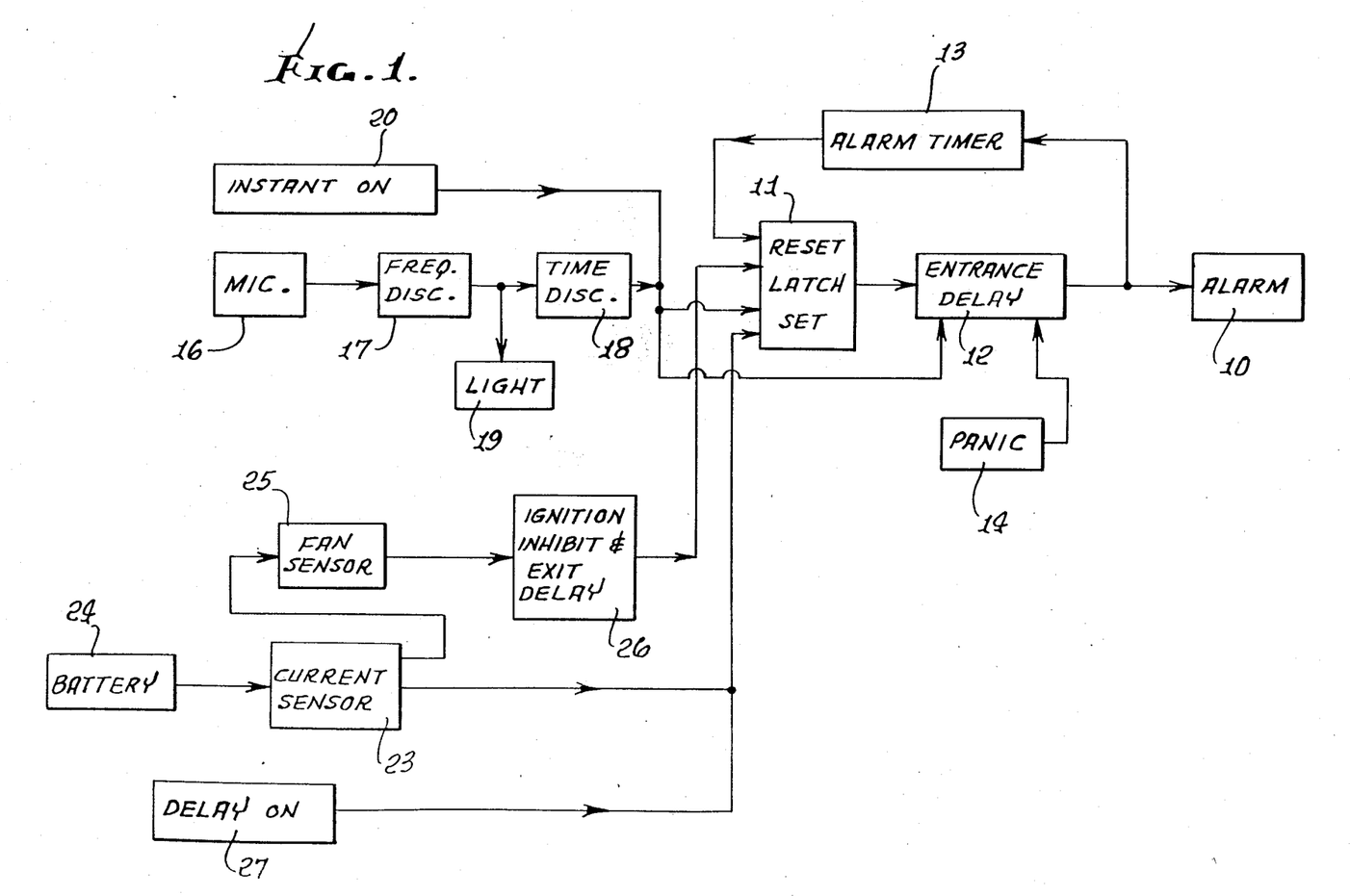
FIG. 1 is an electrical block diagram of a vehicle security system incorporating the presently preferred embodiment of the invention.

The system as shown in FIG. 1 includes an alarm 10 which may be an audible alarm, a visual alarm or a radio transmitted alarm or a combination of two or more of the various alarms available. The alarm is controlled through a latching circuit 11 and an entrance delay circuit 12. An alarm timer 13 connected between the output of the entrance delay and the input of the latching circuit provides for turning off the alarm a predetermined time after it is turned on. A panic switch 14 is directly connected into the entrance delay circuit 12 in such a manner that the entrance delay is bypassed.

A microphone 16 is connected to the latching circuit 11 and to the entrance delay circuit 12 through a frequency discriminator 17 and a time discriminator 18. The output of the discriminator 17 is also connected to an indicator light 19. An instant on switch 20 is also connected to the entrance delay circuit 12 and to the latching circuit 11.

A current sensor 23 responds to changes in the voltage of the vehicle battery 24, with the current sensor output connected to the latching circuit 11. The current sensor output is also connected to a fan sensing circuit 25 which in turn is connected to an inhibit circuit 26 having an output tied into the latching circuit. One or more delay on switches 27 may be utilized and connected into the latching circuit.

The microphone 16 and the discriminators 17, 18 form a noise discriminator circuit. This circuit discriminates against outside street noises, such as motor vehicle operation, construction work, sirens, rain, thunder and the like, while responding to vehicle intrusion type noises such as breaking glass, pry bar use, and the like. Applicants have discovered that by limiting the output of the electrical signals from the microphone to a particular frequency range and to a particular time sequence, highly selective operation can be achieved. The microphone 16 in conjunction with the frequency discriminator 17 provides output signals to the time discriminator only in a frequency band, preferably within the range of about five to about eight kilohertz. The time discriminator 18 is triggered by an electrical signal from the microphone to the frequency discriminator. However once triggered, the time discriminator is not triggered again until a predetermined time has lapsed. Hence continuous sound such as that produced by an automobile engine or a siren will not result in an output from the time discriminator. A first signal to the time discriminator results in a time window, typically in the range of about one to about two seconds, during which no further inputs to the time discriminator will be effective. However in order to provide an output from the time discriminator, another signal must be received after this first time window and within a second time window, typically about ten to about twenty seconds. This dual pulse input requirement with the second pulse occurring within a second time band after a first time band after the first pulse in conjunction with the frequency band achieves the desired noise discrimination.

The dual discriminator circuit with the indicator light 19 provides another feature overcoming a disadvantage of existing systems. It is desirable to periodically test the sensitivity of the microphone utilized in noise detection security systems. However microphone testing ordinarily sets off the alarm, which is undesirable. Existing systems have various inhibiting arrangements, but if the alarm is inhibited there is no indication of microphone operation. The present circuit provides for an output indication, by illuminating the light 19 whenever a sound is picked up by the microphone in the frequency band, even when the alarm portion of the system is inhibited. The microphone operation can be tested by speaking in the vehicle or flicking the microphone cover and noting whether or not the light is energized. In prior systems, the vehicle operator must arm the system, remain in the vehicle until the delay time for exit has passed, and then produce a sound. This energizes the alarm, which can then be turned off. However this short term noise is undesirable, and the length of time required for performing the test is lost time as well as being aggravating.

A conventional current sensor in a vehicle security system will respond to changes in the battery voltage resulting from current loads, such as lights, horns, starter operation, cooling fan operation, and the like. However a sensor which responds to all changes of voltage is not desirable because some of the changes do not occur as a result of an unauthorized entrance. The current sensor 23 is designed to respond only to a specific form of voltage change, which is the waveform produced by energizing a tungsten light bulb of the type utilized in vehicles at various closures. These include the courtesy lights turned on by opening a door and the illumination lights turned on when a hood or trunk lid is raised. The tungsten filament lamp draws an initial high current because of its initial low resistance. As the filament heats, the resistance increases and the current decreases. This action produces a waveform with a steep downward leading edge and a substantially slower rise time and the current sensor 23 is designed to respond to this type of waveform while discriminating against other types of waveform. With this discrimination, the probability of a false is greatly reduced.

Newer vehicles have an electric motor driven fan for cooling the radiator, with the fan controlled by a thermostat so that the fan usually is turned on after the vehicle has stopped. This cooling fan operation may occur minutes after the vehicle has been stopped and the owner has locked the vehicle and departed. Hence a conventional sensor of changes of the battery voltage would respond to the change resulting from fan motor operation and produce a false alarm. The security system of the present invention incorporates a fan noise circuit 25 which responds to battery voltage change due to fan motor operation and inhibits the alarm system, thereby preventing this type of false alarm.

The operation of the system will be better understood in conjunction with the schematic of FIG. 2, which will now be described in greater detail.

Latch and Entrance Delay

When there is an alarm signal at pin 1 or 2 of U2A, pin 9 goes high causing the output of U2B pin 10 to go low. This output is fed back to U2A pin 8 to form a latch to hold the system in the alarm mode. With U2B pin 10 low, capacitor C13 is discharged through R29 and R30. When C13 is discharged sufficiently, the input at U2C pin 4 is near ground, causing the output at pin 6 to go high and initiating an alarm at U4B and U4C. The values for the resistance-capacitance circuit C13, R29, R30 are chosen to provide a desired time delay between receipt of an alarm signal at U2A and initiation of an alarm at U4B and U4C. Typically this delay is about twelve seconds.

Alarm Timer

When the output at U2C pin 6 goes high, the output of U4A pin 6 goes low and C14 discharges through R31. When C14 has discharged sufficiently, the input at U2B pin 12 is low causing the output at pin 10 to go high. This releases the latch of U2A and U2B and charges C13 through R29 which in turn causes the inputs at U2C to go high producing a low at U2C pin 6 and turning off the alarm. The values of the resistance-capacitance circuit C14 and R31 are selected to provide the desired alarm on time, typically about 1½ and 2 minutes.

The alarm circuitry provides an output to a speaker 30 for an audible alarm at the vehicle, and also an output to a transmitter of a paging system so that the vehicle owner can be advised that an alarm has occurred at his vehicle. In the embodiment illustrated, the output at U2C pin 6 turns on Q4 which provides a turn on signal to the pager transmitter 31. The alarm signal from U2C pin 6 is ac coupled to Q4 through C16 and R37, resulting in grounding of the output of Q4 providing the trigger for the pager transmitter.

An oscillator arrangement incorporating U4B, U4C, U3C and U3D provides for a high/low sound at the speaker. The output of U3C at pin 2 directly drives the transistor Q5 providing the power to the speaker. The oscillator circuit incorporating U4B operates at two frequencies, typically 500 hz and 1300 hz, switching from one to the other at the frequency of the oscillator circuit incorporating U4C, typically 2 hz, with the output of the U4C oscillator circuit connected into the U4B oscillator circuit through U3D.

Noise Detection and Discrimination

The microphone 16, usually located within the vehicle, picks up sounds which are converted to electrical signals in the subsequent circuitry. The microphone output is amplified by an ac amplifer U1A and then filtered by C7, R14, providing an input to amplifiers U1B and U1C. The signal is rectified at CR14, R35 and C15, with U1D functioning as an inverting buffer dc amplifier. The resistors R10, R19 and R26 are selected to maintain the U1 amplifiers in the active region. The resistors R15 and R41 and the capacitors C22 and C23 serve as a dc line filter for the microphone amplifier. The ac amplifier and filter in conjunction with the microphone provide band pass filtering for sounds at the microphone. As discussed above, this band pass preferably is in the range of about five to about eight kilohertz.

The output at U1D pin 6 provides a negative or low signal to the input of U1E pin 11 causing the output 10 to go high, in turn causing the output of U1F pin 8 to go low. This forms an ac latch holding the input to U1E low for a time period determined by the resistance-capacitance circuit C26, R47. The latch time typically is in the range of about 1 to about 2 seconds, preferably about 1.5 to 1.7 seconds.

When the output at U1E pin 10 goes high, Q6 is turned on for the latch duration. Current through Q6 energizes CR27 (the indicator light 19), and also charges C30. Under normal conditions, the input to U3F pin 13 is high. The values of C30 and associated components are chosen so that charging C30 for one latching period does not change the level at the input of U3F pin 13 sufficient to cause U3F to change state. If additional sounds are picked up at the microphone during this latching period, nothing further occurs because U1E is latched. If another sound is picked up after the end of the latching period, the sequence will be repeated with U1E and U1F again being latched and providing another turn on of Q6 for the latching period. Two such latching period turn ons of Q6 are sufficient to charge C30 and trigger U3F, providing an output at U3F pin 12.

Each time Q6 is turned on by a sound picked up at the microphone, the light 19 is energized thereby providing a test of the operation of the microphone and of associated circuitry. This testing occurs regardless of whether or not additional sounds are picked up within the appropriate time periods and whether or not there is an actual alarm or alarm is inhibited or delayed.

The capacitor C30 is discharged through resistors R54 and R57 and this resistance-capacitance circuit provides a second time band in the microphone circuit. The discharge time for C30 preferably is about ten to about twenty seconds, typically about fifteen seconds. Since it takes two charging periods with Q6 on to charge C30 sufficiently to provide an output at U3F, the latch circuit U1E, U1F must be triggered twice within this second time band or time window. That is, a second signal at the input of U1E must follow a first signal at said input later than the latch time and less than the C30 discharge time. By way of example if the times are 1½ seconds and 15 seconds respectively, a second noise signal must occur more than 1½ seconds and less than 15 seconds after the first noise signal in order to provide an alarm output indication at U3F. Continuous sounds such as motor operation and sirens provide input pulses at U1E at too short intervals. Intermittent noises which provide input signals at greater intervals than 15 seconds do not produce an output. However it has been found that the jingling of keys, the sounds of breaking glass, and the sounds produced by use of a pry bar normally fall within this acceptable time band.

The noise detection circuit can cause an alarm to be triggered substantially instantaneously. When the output of U3F pin 12 goes high, the output of U3B pin 10 goes low and discharges C13 through R33. This discharge time can be made relatively small, typically ½ second. As described above, discharging C13 triggers the alarm through U2C, thereby circumventing the entrance delay.

Figure 2A:
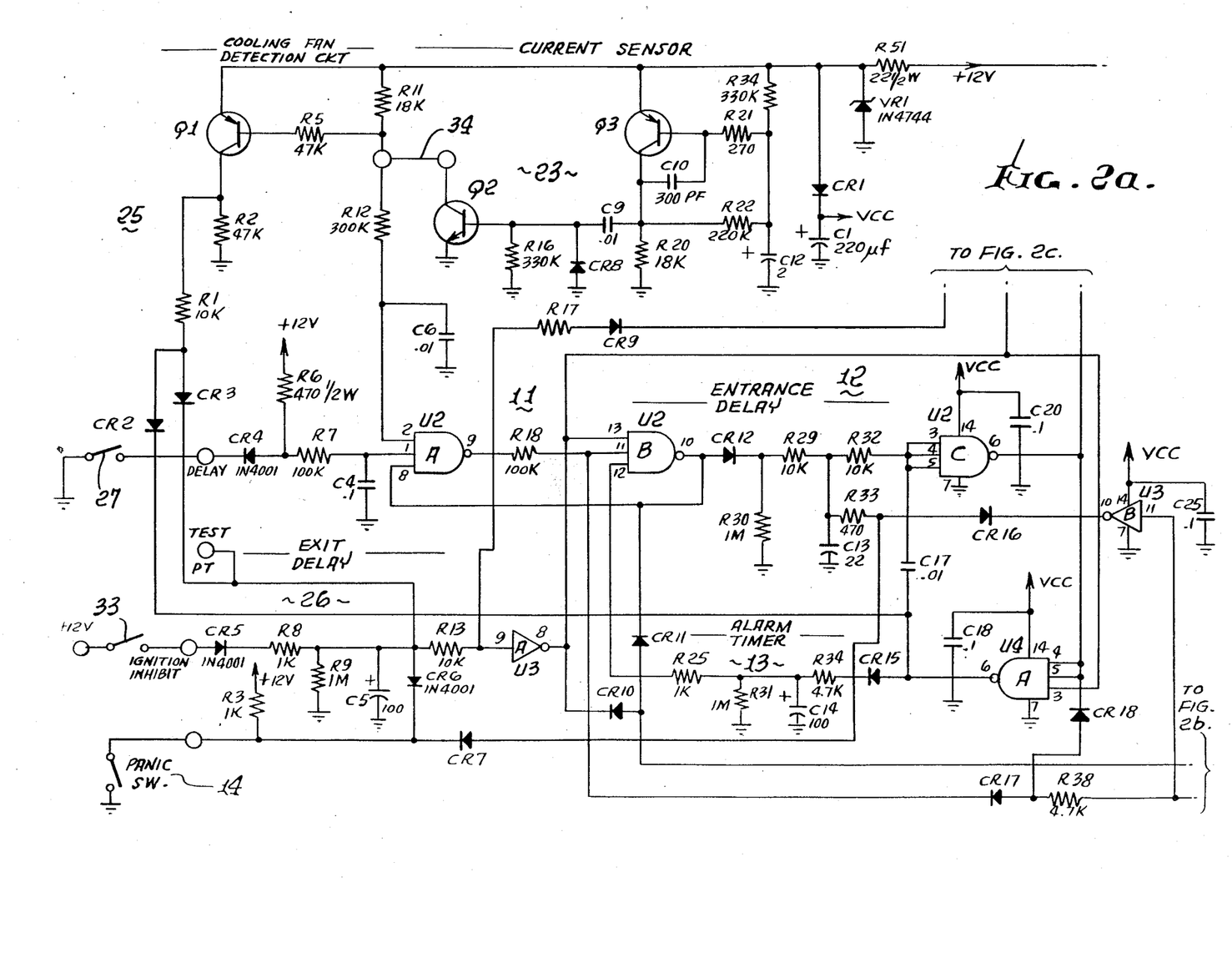
FIGS. 2a, 2b and 2c comprise an electrical schematic of the system of FIG. 1.

This noise detection alarm triggering can be inhibited by the set-reset latching circuit 11, which is desirable when authorized entrance is occurring. By way of example, when the owner of the vehicle opens the driver's door and places the key in the ignition switch, the resulting sounds are picked up by the microphone and would trigger the alarm. An entrance delay switch 27 may be positioned at the driver door jamb for connecting an input of U2A at pin 1 to ground (FIG. 2a). This results in operation of the latch U2A, U2B and when the output of U2B pin 10 is low the output of U3E at pin 6 is high, thereby preventing the input at U3F pin 13 going low. This inhibits triggering of the alarm by output from the noise detection discriminator. Then when the operator turns on the ignition, the alarm is inhibited, as will be described below. If the alarm is not inhibited, the alarm will be triggered at the end of the entrance delay time. Delay on switches may be utilized at other doors also if desired.

Instant On

The instant on switch 20 may be utilized if desired. Closing the instant on switch charges C30 so that within about three seconds (two times the U1E, U1F latching period) U3F is switched, discharging C13 and triggering the alarm. The instant on function will be inhibited by the ignition inhibit operation.

Ignition Inhibit

Switch 33 may be part of the ignition switch or may be controlled by the ignition switch, so that switch 33 is closed when the ignition switch is in the run and crank positions. Closing switch 33 charges C5 through CR5 and R8, providing an input to U2B through U3A and prevents switching of U2B. This prevents an alarm being triggered as a result of action of any of the sensing components. The vehicle security system will remain in the off condition so long as the ignition switch is in the run position. When the ignition switch is turned to off, the ignition portion of the inhibit circuit is no longer operative.

Current Sensor

The current sensor includes transistors Q3 and Q2 and associated components. A signal occurs at the twelve volt battery line when a lamp is energized. Tungsten filament lamps are used for courtesy lights in the passenger compartment and hood and trunk lighting. These lamps are controlled by switches actuated by opening of a door or other closure. This type of lamp has a characteristic waveform with a sharp current rise and slow current drop to the steady state producing a sharp voltage drop at the battery with a slow recovery. The recovery time is determined by the heating time of the lamp filament. The transistor Q3 functions as an amplifier and turns Q2 off when there is a sharp negative going change on the plus voltage line greater than a predetermined amount. The subsequent slow positive going slope turns Q2 on. When Q2 is conducting, C6 is discharged through R12. The values for the resistance-capacitance circuit including R12 and C6 are chosen so that Q2 must be on for about five milliseconds. This corresponds to the slow recovery of the waveform at the battery voltage produced by energizing the tungsten filament lamp. A voltage pulse at the battery of lesser duration would not result in C6 being charged sufficiently to initiate an output at U2A pin 9. This portion of the system may be disabled if desired, by cutting the lead 34.

The noise detection circuit is overridden by the current sensor. Once an alarm signal is initiated by the current sensor, the noise detection circuit is inhibited, and the entrance delay is the controlling function. Consequently, an internal noise picked up by the microphone after the door is opened cannot produce an alarm. This permits authorized entry and starting of the engine.

The components in FIG. 2a adjacent the current sensor, R51, VR1, CR1 and C1, form an active protective circuit for the system. Reverse polarity and/or transients in the voltage supply are prevented from damaging the integrated circuits and other components.

Cooling Fan Detection

Operation of the cooling fan motor produces a plurality of changes in the dc level which will be amplified by Q3, turning on Q2 and discharging C6. However it is undesirable that an alarm be triggered under such circumstances since cooling fan operation is a normal occurrence in an unoccupied, recently operated vehicle. An additional inhibit function is provided in the system so that when current sensing output exists more than a predetermined period of time an alarm will be inhibited.

In one embodiment Q1 is turned on by Q2 and charges C5 through R1. When C5 is charged sufficiently, the alarm is inhibited, as previously discussed. The resistance-capacitance circuit R1 C5 is selected so that if more than one voltage pulse occurs on the twelve volt line within a specified time, typically about four seconds, alarm action will be inhibited. This permits opening of a door to trigger an alarm through the entrance delay of about twelve seconds, while fan motor operation occurring over a period of about four seconds will inhibit alarm triggering.

With the embodiment described above, a break-in occurring during the cooling fan inhibit condition, would not trigger an alarm. An alternative configuration is shown in FIG. 3 wherein the cooling fan inhibit operation only inhibits the current sensor. Components corresponding to those of FIG. 2 are identified by the same reference numerals. The 100 Kohm resistor R18 is divided into two 50 Kohm resistors R18A and R18B. In this embodiment, Q1 charges C5A through R1, with the junction of CR 3 and C5A connected to the junction of R18A and R18B through an inverter 35. The operation is the same as described for the first embodiment, except that only the alarm triggering due to the current sensor and delayed input is inhibited.

Exit Delay

The inhibit circuit previously described also provides a delay in triggering the alarm when the user leaves the vehicle. On exiting the vehicle, noises are produced which may result in an output from the noise detection circuit. Also, one or more doors is opened and closed resulting in an output from the current sensor circuit. However it is desirable that no alarm be triggered as a result of this authorized exit.

As described above, when the ignition inhibit switch 33 is closed, the alarm is inhibited. When this switch is opened when the ignition switch is turned off, C5 is discharged through R9. The components for this resistance-capacitance circuit are selected so that adequate time is provided for leaving the vehicle before the inhibiting function is terminated. Typically this will be about 90 seconds. After C5 is discharged sufficiently, the system will be armed rather than inhibited.

Panic Input

Panic switch 14 is provided to override the various inhibit circuits and delay circuits and produce a substantially instant triggering of the alarm. Closing switch 14 grounds the cathode of CR6, discharging C5 and blocking the inhibiting of the ignition inhibit circuit. Closing the switch 14 also grounds the cathode of CR7, discharging C13 in the entrance delay circuit so that U2C pin 4 goes low and the output of U2C pin 6 goes high triggering the alarm.

Figure 2B:
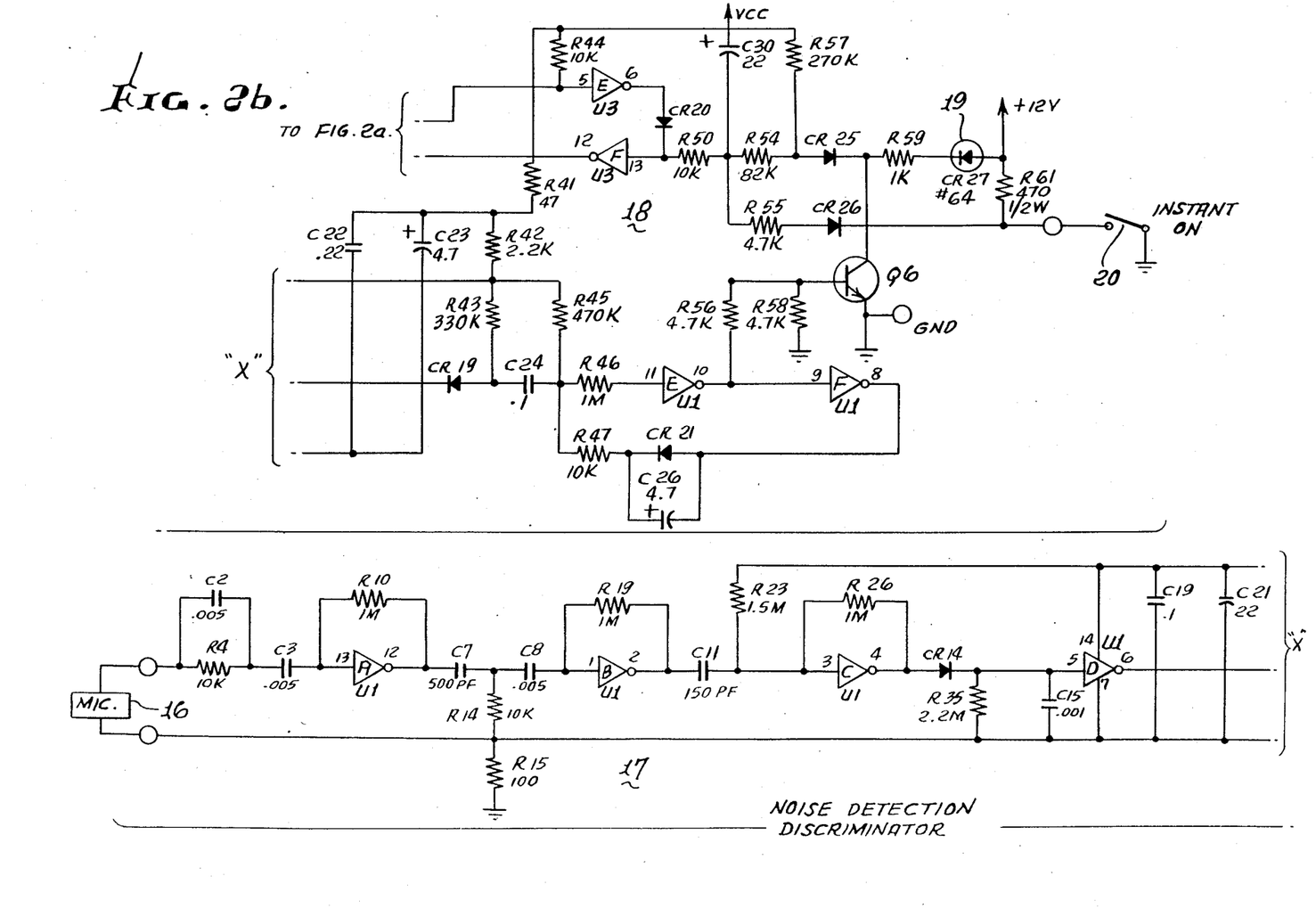
Figure 2C:
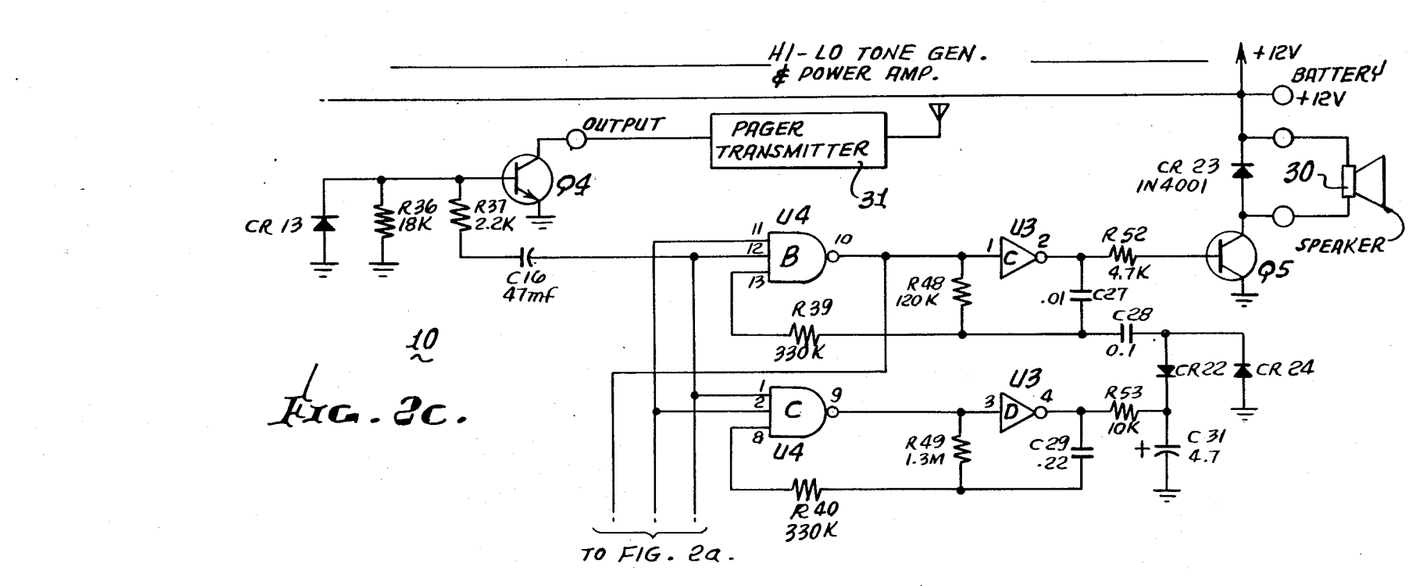
Figure 3:
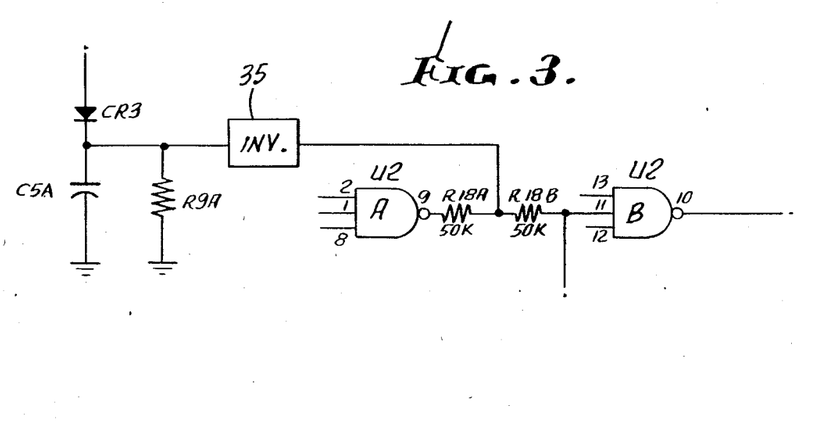
FIG. 3 is an electrical schematic showing an alternative embodiment of a portion of that of FIG. 2.

Preferred values for the various components are set out on FIGS. 2 and 3, and identification of preferred components is given in Table 1.

TABLE 1

| U1 | CD4069UB | Q1 | 2N5087 |
|---|---|---|---|
| U2 | CD4023B | Q2 | 2N4401 |
| U3 | CD40106B | Q3 | 2N5087 |
| U4 | CD4023B | Q4 | 2N4401 |
|  |  | Q5 | T1A110 |
|  |  | Q6 | 2N4401 |

Unless otherwise specified:
all diodes CR are 1N4188;
all capacitor values are in microfareds;
all resistor values are in ohms, ¼ watt.

I claim:

1. In a vehicle security system, the combination of:
a microphone;
frequency discriminator means having the microphone output connected as an input, and providing an output when the input thereto is in a predetermined band in the audio frequency range;
a first timing circuit having the output of said frequency discriminator means as an input, and providing an output on receiving a first input and providing another output only when another and separate input is received more than a predetermined time after initiation of said first input;
a second timing circuit having the output of said first timing circuit as an input, and providing an output on receiving a second input from said first timing circuit in less than a predetermined time after receiving a first input;
alarm means for providing an alarm on receipt of an output from said second timing circuit;
said alarm means including an entrance delay circuit having:
an input latch circuit;
an alarm drive circuit having the output of said input latch circuit as input;
a time delay circuit connected intermediate said input latch circuit and said alarm drive circuit for delaying actuation of said alarm drive circuit a predetermined time after said input latch circuit is actuated; and
a reset timer circuit connected between said alarm drive circuit and said input latch circuit for resetting said latch circuit a predetermined time after said alarm drive circuit is actuated;

with the output of said second timing circuit connected to said time delay circuit for circumventing the predetermined time thereof; and alarm inhibit means for inhibiting actuation of said alarm drive circuit, said alarm inhibit means including means for preventing setting of said input latch circuit and a switching circuit actuated by the cooling fan motor of the vehicle.

2. A vehicle security system as defined in claim 1 wherein said frequency discriminator means provides an output when the input thereto is in the range of about five to about eight kilohertz.

3. A vehicle security system as defined in claim 2 wherein said predetermined time for said first timing circuit is in the range of about one to about two seconds, and said predetermined time for said second timing circuit is in the range of about 10 to about 20 seconds.

4. A vehicle security system as defined in claim 1 wherein said frequency discriminator means provides an output when the input thereto is the result of the sounds of breaking glass.

5. A vehicle security system as defined in claim 1 wherein said first timing circuit includes first and second amplifiers connected in series in a latch circuit with a first resistance-capacitance circuit for controlling the latching period corresponding to said first timing circuit predetermined time, with the output of said first amplifier connected as input to said second timing circuit.

6. A vehicle security system as defined in claim 5 wherein said second timing circuit includes:
   a second resistance-capacitance circuit; and
   means for charging the capacitor of said second resistance-capacitance circuit when there is an output from said first timing circuit, with the discharge period of said second resistance-capacitance circuit corresponding to said second timing circuit predetermined time.

7. A vehicle security system as defined in claim 1 wherein said time delay circuit includes
   a first resistance-capacitance circuit with the charge level of the capacitor of said first resistance-capacitance circuit controlling said alarm drive circuit, and
   means for connecting the output of said second timing circuit to said first resistance-capacitance circuit capacitor for varying the charge thereon.

8. A vehicle security system as defined in claim 7 including switching means for setting said input latch circuit and thereby changing the charge on said first resistance-capacitance circuit capacitor.

9. A vehicle security system as defined in claim 8 wherein said switching means is a mechanically actuated switch.

10. A vehicle security system as defined in claim 8 wherein said switching means is a current actuated switch.

11. A vehicle security system as defined in claim 1 wherein said alarm inhibit means includes a switch actuated by the vehicle ignition switch.

12. A vehicle security system as defined in claim 1 wherein said means for preventing setting includes
   a second resistance-capacitance circuit with the charge level of the capacitor of said second resistance-capacitance circuit controlling said input latch circuit, and
   switch means for connecting said second resistance-capacitance circuit capacitor to a voltage source.

13. In a vehicle security system, the combination of:
   a microphone for converting sound to electrical signals;
   alarm means;
   noise discriminator means connected between said microphone and said alarm means for producing an output for triggering said alarm means in response to non-continuous electrical signals from said microphone when a signal occurs after a preceding signal within a predetermined time span;
   said alarm means including entrance delay means for delaying triggering of said alarm means for a predetermined time, with the output of said noise discriminator means connected to said entrance delay means for initiating the predetermined time thereof;
   a first switching means actuated by movement of a vehicle closure for initiating the predetermined time of said entrance delay means; and
   a second switching means for inhibiting triggering of said alarm means, said second switching means includes a switching circuit actuated by the cooling fan motor of the vehicle.

14. A vehicle security system as defined in claim 13 wherein said second switching means includes a switch actuated by the vehicle ignition switch.

15. In a vehicle security system, the combination of:
   an alarm;
   an alarm control circuit for turning said alarm on and off; and
   a first current sensing circuit responsive to a change in vehicle battery voltage and providing an output when there is a voltage change of first predetermined magnitude and first time duration corresponding to the waveform resulting from energizing an incandescent lamp filament, with the output of said first current sensing circuit connected as an input to said alarm control circuit;
   said alarm control circuit including
   first time delay means for delaying alarm turn-on a predetermined time after said alarm control circuit receives an input from said first current sensing circuit, and
   a second current sensing circuit responsive to a change in vehicle battery voltage and providing an output when there is a voltage change of second predetermined magnitude and second time duration, with said second time duration substantially greater than said first time duration, with the output of said second sensing circuit connected as an input to said alarm control circuit for inhibiting alarm turn-on.

16. A vehicle security system as defined in claim 15 including a vehicle closure switch connected as an input to said alarm control circuit.

17. A vehicle security system as defined in claim 15 wherein said voltage change duration is of at least about five milliseconds.

18. A vehicle security system as defined in claim 15 including alarm inhibit means for preventing alarm turn-on.

19. A vehicle security system as defined in claim 18 wherein said alarm inhibit means includes a switch actuated by the vehicle ignition switch.

20. A vehicle security system as defined in claim 15 wherein said alarm control circuit includes second time delay means connected between said alarm control circuit output and input for turning said alarm off a predetermined time after it is turned on.

21. A vehicle security system as defined in claim 15 including:
   alarm inhibit means for preventing alarm turn-on;
   a panic switch; and
   circuit means controlled by said panic switch for blocking operation of said alarm inhibit means and said first time delay means and for actuating said alarm control circuit to turn on said alarm.

22. A vehicle security system as defined in claim 21 including a second current sensing circuit responsive to a change in vehicle battery voltage and providing an output when there is a voltage change of predetermined magnitude and second duration, with said second time duration substantially greater than said first time duration and less than said first time delay means predetermined time, with the output of said second sensing circuit connected as an input to said alarm control circuit for inhibiting alarm turn-on.

23. In a security system for a vehicle having an electrical power supply, the combination of:
   alarm means;
   first sensing means for sensing a change in the output of said power supply corresponding to the turn-on current waveform resulting from energizing an incandescent filament lamp and producing a first output signal when such a change is sensed;
   delay means providing a time delay between the input and output thereof;
   means for connecting said first sensing means output signal to said first delay means input;
   means for connecting said first delay means output to said alarm means for triggering an alarm;
   inhibit means for preventing energizing of said alarm means;
   switch means for actuating said inhibit means;
   second sensing means for sensing a change in the output of said power supply corresponding to continued running of an electric motor over a predetermined time period and producing a second output signal when such a change is sensed; and
   means for connecting said second sensing means output signal to said inhibit means in controlling relation.

* * * * *